(12) United States Patent
Keohane et al.

(10) Patent No.: US 8,200,696 B2
(45) Date of Patent: Jun. 12, 2012

(54) PRESENTING MULTIPLE POSSIBLE SELECTABLE DOMAIN NAMES FROM A URL ENTRY

(75) Inventors: Susann M. Keohane, Austin, TX (US);
Gerald F. McBrearty, Austin, TX (US);
Shawn P. Mullen, Buda, TX (US);
Jessica Murillo, Hutto, TX (US);
Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1827 days.

(21) Appl. No.: 11/138,828

(22) Filed: May 26, 2005

(65) Prior Publication Data
US 2007/0011168 A1    Jan. 11, 2007

(51) Int. Cl.
*G06F 17/30* (2006.01)
(52) U.S. Cl. ......... 707/781; 707/922; 709/238; 709/245
(58) Field of Classification Search ......... 707/3, 999.01, 707/781, 922; 709/203, 219, 238, 245
See application file for complete search history.

(56) References Cited

U.S. PATENT DOCUMENTS

| | | | | |
|---|---|---|---|---|
| 5,764,906 A | * | 6/1998 | Edelstein et al. | 709/219 |
| 6,009,459 A | * | 12/1999 | Belfiore et al. | 709/203 |
| 6,092,100 A | * | 7/2000 | Berstis et al. | 709/203 |
| 6,356,908 B1 | * | 3/2002 | Brown et al. | 707/10 |
| 6,560,634 B1 | * | 5/2003 | Broadhurst | 709/203 |
| 6,606,653 B1 | * | 8/2003 | Ackermann et al. | 709/219 |
| 6,678,717 B1 | * | 1/2004 | Schneider | 709/203 |
| 6,760,746 B1 | * | 7/2004 | Schneider | 709/203 |
| 6,785,723 B1 | | 8/2004 | Genty et al. | 709/224 |
| 6,829,638 B1 | | 12/2004 | McBrearty et al. | 709/219 |
| 6,895,430 B1 | * | 5/2005 | Schneider | 709/217 |
| 2003/0005157 A1 | * | 1/2003 | Chung et al. | 709/245 |
| 2005/0198386 A1 | * | 9/2005 | Accapadi et al. | 709/245 |
| 2006/0031385 A1 | * | 2/2006 | Westerdal | 709/217 |
| 2008/0005342 A1 | * | 1/2008 | Schneider | 709/230 |

OTHER PUBLICATIONS

Nsraoui, Olfa; Pavuluri, Mrudula; Accurate Web Recommendations Based on Profile-Specific URL-Predictor Neural Networks; May 22, 2004; ACM Press; WWW pp. 300-301.*
Whois.Net Domain-Based Research Sevices, www.whois.net, 1999-2007.*

* cited by examiner

*Primary Examiner* — Dennis Truong
(74) *Attorney, Agent, or Firm* — Matthew W. Baca; Amy J. Pattillo

(57) ABSTRACT

A domain name system (DNS) resolver within a network detects a URL entry including at least a portion of a particular domain name. The DNS resolver automatically selects multiple possible domain names for at least said portion of said particular domain name, wherein each of the multiple possible domain names includes a separate one of multiple ending types available for a domain. The multiending controller directs concurrent output of a separate selectable thumbnail representation of a separate webpage accessible from each of the selection of multiple possible domain names within an interface of a browser.

18 Claims, 4 Drawing Sheets

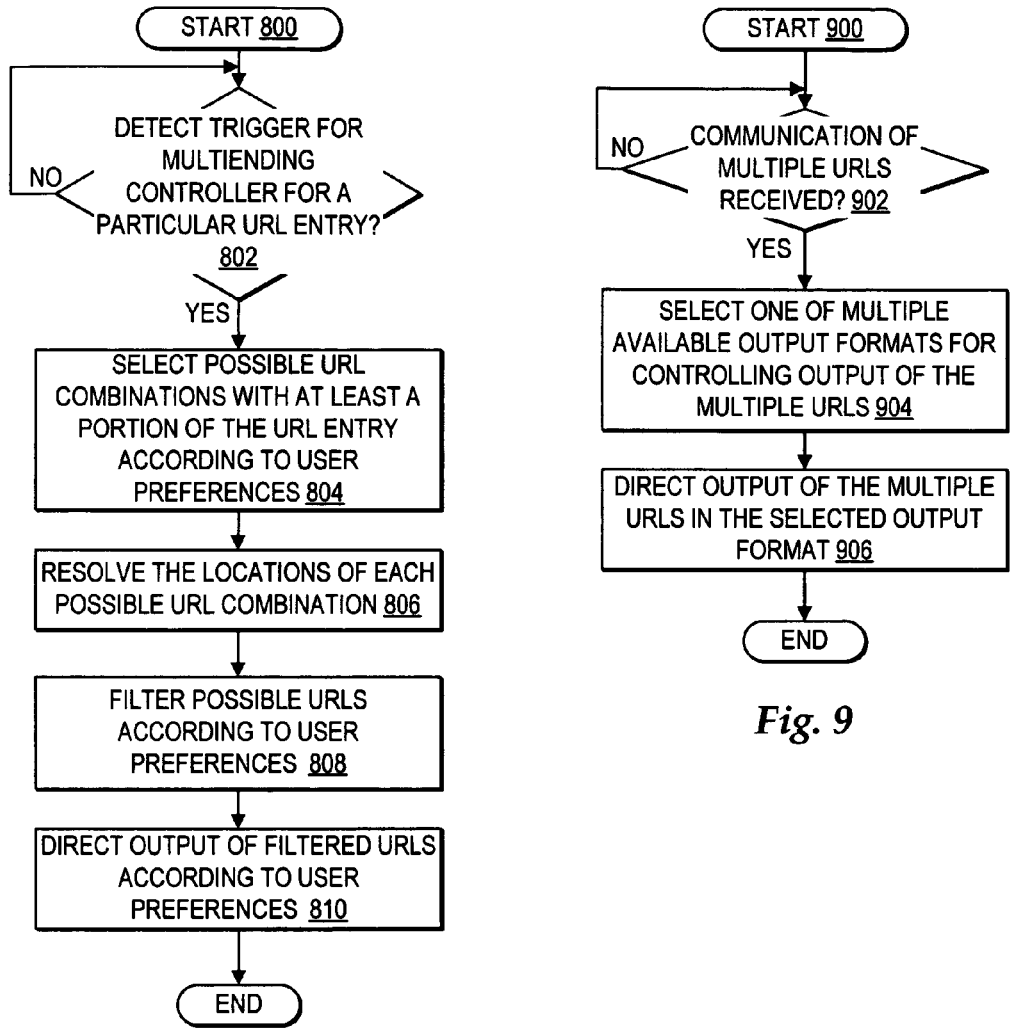

PRESENTING MULTIPLE POSSIBLE SELECTABLE DOMAIN NAMES FROM A URL ENTRY

BACKGROUND OF THE INVENTION

1. Technical Field

The present invention relates in general to computer managed communication networks and, particularly, to the detection of a Universal Resource Location (URL) entry and concurrent presentation of multiple possible domain names with separate ending types, wherein each of the multiple possible domain names includes at least a portion of the URL entry.

2. Description of the Related Art

Within a computer managed communication network, such as the Internet, each computer system accessible via the network is typically identified by an address. In the example of the Internet, Transmission Control Protocol/Internet Protocol (TCP/IP) controls the distribution of packets of information between computer systems, where each packet is directed from a system at one network address to a system at another network address. An IP address, identifying a location of system within a network, may take the form of a numerical address, such as 165.55.128.60.

More user friendly networks, such as the Internet, may implement an address translation system, such as the Domain Name System (DNS), so that users may request access to other systems through a name based address rather than a numerical IP address. The DNS can be implemented through DNS servers that store database tables of the domain name corresponding to an IP address. A user seeking to access a web page located at a particular server need only enter the domain name, such as "www.abc.com" rather than the IP address of the server location, and the DNS server translates the domain name into the associated IP address.

Domain names in the Internet based network are hierarchically configured. For example, in the domain name "www.ibm.com", ".com" is the ending which identifies the type of domain. If one DNS server cannot locate a particular domain name, that DNS server will send the domain name entry to a DNS server with a database of domain names ending with ".com" or search for other DNS servers that are able to translate the domain name. While a DNS server can search other DNS servers for a domain name entry, currently the user must still enter a valid and complete domain name if a DNS server is to locate an IP address for the domain name. A web browser, through which a user may enter domain name access requests, views a domain name entry as a Universal Resource Locator (URL) which also identifies the type of protocol used, such as File Transfer Protocol (FTP) or Hypertext Transfer Protocol (HTTP), and directs the domain name access request to a DNS server that services domain names of the particular protocol type.

Initially, when the Internet started becoming more accessible to the public, few domain name types or endings were available. Today, one of the common expectations of the Internet is that most important web sites end with ".com" or ".edu", even though the number of domain name endings has been expanded to include endings such as ".net", ".org", ".tv", and others. With so many different endings available, if a user only knows a portion of a domain name but not the specific ending type, the user may end up looking up page after page with each ending that the user knows in an attempt to locate a particular web page with information expected by the user. Thus, one limitation of the DNS and other addresses translations systems is that the user must know and enter a full domain name, including correct ending, to access a desired web page. Further, a limitation of web browsers and other web access software is that a user can only attempt to access one domain name at a time in a single web browser window.

SUMMARY OF THE INVENTION

Therefore, in view of the foregoing, the present invention provides for a service that detects a Universal Resource Location (URL) entry and concurrently presents multiple possible domain names with separate ending types, wherein each of the multiple possible domain names includes at least a portion of the URL entry, for selection by a user.

In one embodiment, a method for determining multiple available domain names from a URL entry includes, responsive to detecting a URL entry from a browser including at least a portion of a particular domain name at a domain name system (DNS) resolver of a computer system, automatically selecting, by the DNS resolver, multiple possible domain names for at least the portion of the domain name, wherein each of the multiple possible domain names comprises a separate one of multiple ending types. The method includes querying, by the DNS resolver, at least one DNS server to resolve each of the multiple possible domain names. The method includes detecting, by the DNS resolver from the at least one DNS server, a selection of the multiple possible domain names each resolved with a separate associated network address within a network.

The method includes directing, from the DNS resolver to a browser, concurrent output of a separate selectable thumbnail representation of a separate web page accessible from each of the selection of the multiple possible domain names within an interface of the browser, such that a user is enabled to quickly determine the selection of the multiple possible domain names from entry of at least the portion of the domain name as the URL entry.

In another embodiment, a system determines, in a computer network, multiple available domain names from a universal resource location (URL) entry. The system includes a domain name system (DNS) resolver configured on at least one computer system having an interface for communicating over a computer network. The system includes the DNS resolver configured to detect a URL entry entered by a user through a browser comprising at least a portion of a domain name. The system includes the DNS resolver configured to automatically select multiple possible domain names for at least the portion of the domain name, wherein each of the multiple possible domain names comprises a separate one of a multiple ending types. The system includes the DNS resolver configured to queryat least one DNS server via the computer network to resolve each of the possible domain names. The system includes the DNS resolver configured to detect selection of the possible domain names each resolved with a separate associated network address within the computer network from the at least one DNS server. The system includes the DNS resolver configured to direct to a browser concurrent output of a separate selectable thumbnail representation of a separate web page accessible from each of the selection of the possible domain names within an interface of the browser to the user.

In another embodiment, a computer program product for determining multiple available domain names from a URL entry includes a computer readable non-transitory storage medium having computer readable program code embodied therewith. The computer program product includes the computer readable program code configured to detect a URL entry from a browser comprising at least a portion of a domain name at a domain name system (DNS) resolver. The computer program product includes the computer readable program code configured to automatically select by the DNS resolver, multiple possible domain names for at least the portion of said domain name, wherein each of the possible domain names comprises a separate one of multiple ending types. The computer program product includes the computer readable program code configured to query, by the DNS resolver, at least one DNS server to resolve each of the possible domain names. The computer program product includes the computer readable program code configured to detect, by the DNS resolver from the at least one DNS server, a selection of the possible domain names each resolved with a separate associated network address within a network. The computer program product includes the computer readable program code configured to direct, from the DNS resolver to a browser, concurrent output of a separate selectable thumbnail representation of a separate web page accessible from each of the selection of the possible domain names within an interface of the browser.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 is a high level logic flowchart depicting a process and program for detecting an incomplete URL entry and resolving multiple possible URLs for the incomplete URL entry; and FIG. 9 is a high level logic flowchart depicting a process and program for responding to multi-ending options.

DETAILED DESCRIPTION OF THE PREFERRED EMBODIMENT

Figure 1:
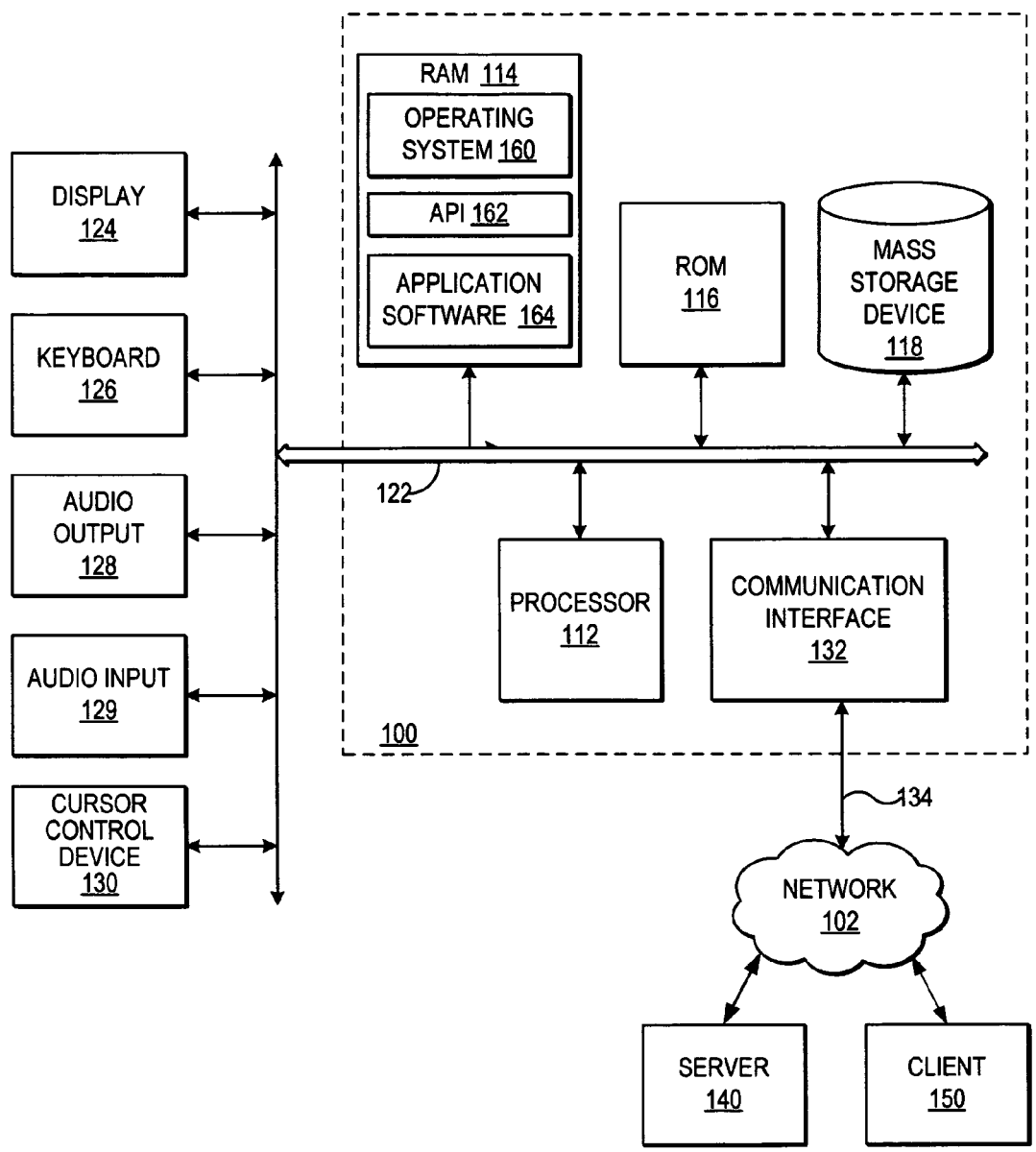
FIG. 1 is a block diagram depicting a computer system in which the present method, system, and program may be implemented.

Referring now to the drawings and in particular to FIG. 1, there is depicted one embodiment of a computing system through which the present method, system, and program may be implemented. The invention may be executed in a variety of systems, including a variety of computing systems and electronic devices.

Computer system 100 includes a bus 122 or other communication device for communicating information within computer system 100, and at least one processing device such as processor 112, coupled to bus 122 for processing program code and data. Bus 122 may include low-latency and higher latency paths that are connected by bridges and adapters and controlled within computer system 100 by multiple bus controllers. Processor 112 may be a general-purpose processor such as IBM's PowerPC (PowerPC is a registered trademark of International Business Machines Corporation) processor. When implemented as a server system, computer system 100 typically includes multiple processors designed to improve network servicing power.

Processor 112 is coupled, directly or indirectly, through bus 122 to memory elements. During normal operation, processor 112 processes data under the control of program code accessed from the memory elements. Memory elements can include local memory employed during actual execution of the program code, such as random access memory (RAM) 114, bulk storage, such as mass storage device 118, and cache memories (not depicted) which provide temporary storage of at least some program code to reduce the number of times code must be retrieved from bulk storage during execution. In one example, the program code accessible in RAM 114 is an operating system 160 and application software 164. Operating system 160 includes program code that facilitates, for example, a graphical user interface (GUI) via a display 124 and other output interfaces.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. For example, in one embodiment, operating system 160 and/or application software 164 contains program code that when executed on processor 112 carry out the operations depicted in the flow diagrams and flowcharts of FIGS. 8 and 9 and other operations described herein. Alternatively, the steps of the present invention might be performed by specific hardware components that contain hardwired logic for performing the steps, or by any combination of programmed computer components and custom hardware components. Additionally, RAM 114 may include an application programming interface (API) 162 or other interface that provides extensions to enable application developers to develop application software 164 that extend the functionality of operating system 160.

In addition, the invention can take the form of a computer program product accessible from a computer-usable or computer readable medium providing computer readable program code for use by or in connection with computer system 100 or any instruction execution system. For purposes of this description, a computer-usable or computer readable medium can be any apparatus that can contain, store, communicate, propagate, or transport the program for use by or in connection with the instruction execution system, apparatus, or device. In one example, a computer-usable or computer readable medium is any apparatus that participates in providing program code to processor 112 or other components of computer system 100 for execution.

Such a medium may take many forms including, but not limited to, electronic, magnetic, optical, electromagnetic, infrared, or semiconductor system (or apparatus or device) or a propagation medium. Examples of a computer readable medium include, but are not limited to, a semiconductor or solid state memory, magnetic tape, a flexible disk, a hard disk, a removable computer diskette, random access memory (RAM) 114, read-only memory (ROM) 116, punch cards or any other physical medium with patterns of holes, a rigid magnetic disk and an optical disk. Current examples of optical disks include a compact disc ROM (CD-ROM), a compact disc-read/write (CD-R/W) and a digital video disc (DVD). In another example, a computer readable medium may include mass storage device 118, which as depicted is an internal component of computer system 100, but may be provided as a device external to computer system 100.

A communication interface 132 including network adapters may also be coupled to the system to enable computer system 100 to become coupled to other computer systems, such as server 140 or client 150, remote printers, or storage devices through intervening private or public networks. Network adapters within communication interface 132 may include, but are not limited to, modems, cable modems, and Ethernet cards.

In particular, communication interface 132 enables coupling to other devices through a network link 134 to a network 102. For example, a local area network (LAN), wide area network (WAN), or an Internet Service Provider (ISP) may facilitate network link 134. Network link 134 may provide wired and/or wireless network communications to one or more networks, such as network 102. Network 102 may refer to the worldwide collection of networks and gateways that use a particular protocol, such as Transmission Control Protocol (TCP) and Internet Protocol (IP), to communicate with one another.

In general, network link 134 and network 102 both use electrical, electromagnetic, or optical signals that carry digital data streams. The signals through the various networks and the signals on network link 134 and through communication interface 132, which carry the digital data to and from computer system 100, are examples of forms of carrier waves transporting the information. In one example, a remote computer, such as server 140 transfers the program code for the invention to requesting computer system 100 by way of data signals embodied in a carrier wave or other propagation medium via a network link 134 to a communications interface 132 coupled to bus 122.

When implemented as a server system, computer system 100 typically includes multiple communication interfaces accessible via multiple peripheral component interconnect (PCI) bus bridges connected to an input/output controller. In this manner, computer system 100 allows connections to multiple network computers, such as client 150, via network 102.

In addition, computer system 100 typically includes multiple peripheral components (e.g. input/output devices) that facilitate communication. These peripheral components are coupled to computer system 100 either directly or indirectly through connections to multiple input/output (I/O) controllers, adapters, and expansion slots coupled to one of the multiple levels of bus 122. For example, an audio output device 128 and audio input device 129 are connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
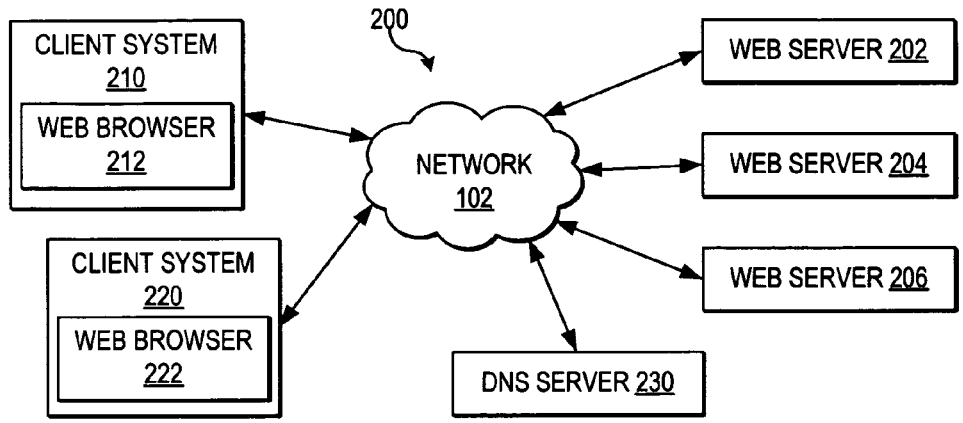
FIG. 2 is a block diagram depicting a network environment for supporting web page access.

With reference now to FIG. 2, a block diagram depicts a network environment for supporting web page access in accordance with the method, system, and program of the present invention. As illustrated, a distributed network 200 is a network of multiple computer systems such as client system 210, client system 220, web server 202, web server 204, web server 206, and DNS server 230, through which web pages are accessed and downloaded. In alternate embodiments, distributed network 200 may include other embodiments of computing systems enabled to communicate with one another via a connection. Although not depicted in FIG. 2, following the description of computing system 100, in general, each of client system 210, client system 220, web server 202, web server 204, web server 206, and DNS server 230 includes at least one processor and memory for supporting program code which may include an operating system, APIs, and application programs. In addition, web server 202, web server 204, web server 206, and DNS server 230 other systems that perform server functions may include middleware applications loaded into memory that support server functions, where the middleware applications may include, for example, IBM's Websphere or NetFinity (Websphere and NetFinity are registered trademarks of International Business Machines Corporation).

In the embodiment, distributed network 200 includes network 102, which is the medium used to provide communications links between various devices and computers connected together within distributed network 200. Network 102 may include permanent connections such as wire or fiber optics cables and temporary connections made through telephone connections and wireless transmission connections, for example.

In particular, in the embodiment, distributed network 200 includes at least one server, such as web server 202, web server 204, or web server 206, and at least one client, such as client systems 210 and 220, communicatively connected via network 102. In addition, distributed network 200 may include at least one Domain Name System (DNS) server, such as DNS server 230, for implementing the Domain Name System or other address translation service. It will be understood that each of web servers 202, 204, and 206, DNS server 230, and client systems 210 and 220 may be distributed in geographically disparate locations throughout heterogeneous types of computer systems operating within disparate local networks. In addition, it will be understood that web servers 202, 204, and 206 and DNS server 230 may represent a single server system, a cluster of server systems, a grid of server systems, or other combination of systems providing access to a particular web page or multiple web pages. In addition, it will be understood that distributed network 200 may include additional servers, clients, and other devices not shown.

Web servers 202, 204, and 206, DNS server 230 and client systems 210 and 220 may communicate within distributed network 200 in conformance with different network environment architectures. In the embodiment depicted, distributed network 200 conforms to a client/server network architecture where web servers 202, 204, and 206 perform as servers for providing web services, such as downloading web pages, to client system 210 and client system 220 responsive to requests for web services from client system 210 and client system 220. In facilitating the client/server environment, in one example, network 102 represents the worldwide collection of networks and gateways that use the TCP/IP suite of protocols to communicate with one another. In another example, network 102 is implemented as an intranet, a local area network (LAN), or a wide area network (WAN). It will be understood that distributed network 200 may conform to other network environments or a combination of multiple types of network environments. Further, it will be understood that in the client/server environment, any of client systems 210 and 220 may perform as a "server" if providing web services to another computer system via network 102. Additionally, it will be understood that distributed network 200 may support peer-to-peer network communications between client system 210 and client system 220, where one client system distributes a web page to another client system.

Each of web server 202, 204, and 206 may maintain separate communications with and downloads web pages and other data to client systems 210 and 220 via network 102 responsive to requests and communications received from client systems 210 and 220. In one embodiment, a web page is a document consisting of a particular web protocol based file, with associated files for graphics, embedded audio and video players, and scripts.

A web page may be identified and requested by a uniform resource locator (URL) or an IP address. A URL specifies the protocol to be used in accessing the web page and the domain name address or IP address correlating to a web server at which the web page resides. A domain name address may include multiple hierarchical levels. For example, a domain name address may include a type ending, such as .com, .edu, .org, .net, .tv, or other available type endings. In addition, a domain name address may indicate other levels, as separated by periods, backslashes, and other separators.

To facilitate user ease in entering a URL to request access to a web page, distributed network 200 may support an addressing system, such as the Domain Name Service, that translates domain name addresses into network location numerical addresses. For example, where network 102 represents the Internet, web pages accessible from each of web servers 202, 204, and 206 are assigned both an alphanumeric domain name address and a numerical network IP address. DNS server 230 may maintain a database of web server domain name addresses and corresponding network IP addresses. When DNS server 230 receives a domain name address resolution request, DNS server 230 attempts to translate the domain name address into an IP address and return the IP address to the requesting system. If DNS server 230 is not able to locally translate the domain name address, DNS server 230 may transfer the domain name address resolution request to other DNS servers with other translation tables. It is important to note that while the invention is described with reference to the DNS, in other embodiments, where user entries are translated into a network address, the present invention may be implemented.

Client systems 210 and 220 include software that facilitates communication with web server 202. In one embodiment, client systems 210 and 220 include web browsers 212 and 222, respectively, where a web browser is application software that facilitates web page access requests and the display of accessed web pages through browser windows displayed in output interfaces, such as a graphical user interface, associated with client systems 210 and 220. It will be understood that web browsers 212 and 222 may be integrated within an operating system, such as operating system 160, or may be included within application software 164, as stand-alone applicants. Further, it will be understood, that in addition to web browsers 212 and 222, the operating system or other application software may provide additional components and interfaces for enabling users to select to access web pages. For example, a stand-alone application may automatically request access to a web page that provides weather information every five minutes, and update a user interface specified for displaying the weather information alone.

In one embodiment, when a user at any of client systems 210 and 220 enters or selects a URL for access via one of web browsers 212 or 222, for example, if the URL includes a domain name address, web browsers 212 or 222 will pass the domain name address to a DNS resolver (not depicted in FIG. 2). The DNS resolver determines which DNS server, such as DNS server 230, to pass the domain name address with a request for resolution of the IP address associated with the domain name address. Client system 210 and 220 may include DNS resolver software or may pass the domain name address to a DNS resolver residing in another client system or in a server system accessible via network 102. The DNS resolver will receive an IP address in response to the resolution request, if DNS server 230 can locate an IP address matching the domain name address, or will receive an error message indicating a lack of matching IP address or domain name registration. The DNS resolver passes the IP address or error to the requesting software application, such as one of web browsers 212 or 222, and the requesting software application then sends a communication request to the returned IP address or controls output of an error message to the user.

According to an advantage, distributed network 200 may include a multiending controller (not depicted in FIG. 2), that selects multiple URL name combinations for a URL entry, determines which of the multiple URL name combinations are accessible, and directs output of the accessible multiple URL name combinations for selection by the user. In one embodiment, the multiending controller is triggered when an incomplete URL entry is detected. In another embodiment, the multiending controller is triggered by a user request. As will be further described, the multiending controller may be incorporated within or distributed across any of client systems 210 and 220, web servers 202, 204, and 206, DNS server 230 or within a separate, dedicated server system.

Figure 3:
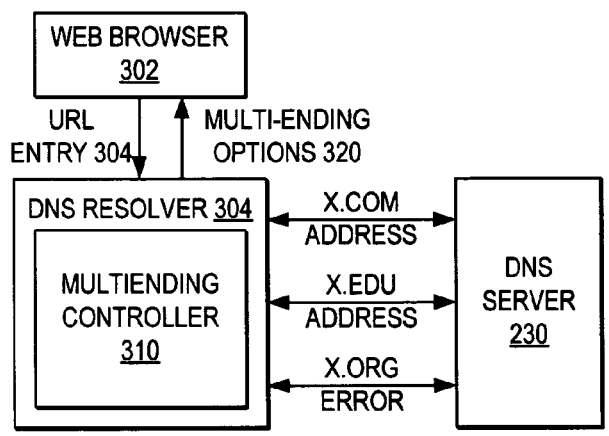
FIG. 3 is a block diagram depicting one embodiment of a multiending controller for detecting multiple possible URLs from a portion of a URL name and returning a selection of accessible URL name combinations for selection by a user.

With reference now to FIG. 3, a block diagram illustrates one embodiment of the implantation of a multiending controller for detecting multiple possible URLs from a portion of a URL name and returning a selection of accessible URL name combinations for selection by a user. In the example, a web browser 302 passes a URL entry 304 to a DNS resolver 304. Web browser 302 facilitates a user interface for displaying web pages accessed from web servers, such as web server 202, and for responding to user inputs, such as input of a URL entry. DNS resolver 304 facilitates the resolution of a location of the web server hosting a web page identified by a URL entry. In one embodiment, web browser 302 and DNS resolver 304 are applications residing within a single client system, such as client system 210. In another embodiment, web browser 302 and DNS resolver 304 are applications distributed across a client system and a server system or service provider system.

In the example, DNS resolver 304 includes a multiending controller 310. Multiending controller 310 detects URL entry 304 is incomplete and determines a first selection of URL name combinations with the portion of the URL name. In particular, multiending controller 310 may both passively and actively detect incomplete URL entries. In one embodiment, multiending controller 310 detects that URL entry 304 is incomplete by detecting that the URL cannot be resolved. In another embodiment, multiending controller 310 actively monitors each URL entry to determine if all the required portions of a URL are included. In yet another embodiment, web browser 302 may include a selectable multiending option, that when selected by a user upon entry of a URL through a web browser window, indicates that the URL entry is incomplete and that multiple URL name combinations for the URL should be returned.

Multiending controller 310 directs DNS resolver 304 to send requests to resolve the location of each of the URL name combinations to DNS server 230. In particular, in the example, URL entry 304 is "X". Multiending controller 310 detects that URL entry 304 lacks a URL ending and selects URL name combinations "X.com", "X.edu", and "X.org". DNS resolver 304 sends each of the URL name combinations to DNS server 230 for resolution of the location of each of URL name combination. DNS server 230 determines the location of each URL name combination and returns the location addresses to DNS resolver 304. It is important to note that although the invention is described with reference to multiending controller 310 selecting URL name combinations to complete a URL entry, multiending controller 310 may also detect a complete URL, but select URL name combinations that vary the ending type or other portions of the URL.

In addition, in the example, multiending controller 310 detects when the locations of URL name combinations are retrieved and returns multi-ending options 320 to web browser 302. Multi-ending options 320 include all or a selection of the URL name combinations and resolved locations for URL entry 304. In the example, when multiending controller 310 detects a URL name combination without a location, such as the error indicator for "X.org", that URL name combination is not included in multi-ending options 320. In one embodiment, multi-ending options 320 are returned as a web page for output within a web browser window facilitated by web browser 302. In another embodiment, multi-ending options 320 are returned in a format supported by web browser 302 for displaying multiple URL name combinations. In particular, web browser 302 may provide multiple selectable output formats for controlling output of multiple URLs returned by multiending controller 310, where multiending controller 310 specifies a particular selectable output format or where a user preference for web browser 302 specifies a particular selectable output format.

It is important to note that in an alternate embodiment, other applications or computing systems may pass URL entry 304 to DNS resolver 304. In addition, it is important to note that in an alternate embodiment, DNS server 230 may include multiending controller 310, such that DNS server 310 detects that a URL entry from DNS resolver 304, selects URL name combinations, resolves the locations of each URL name combination and returns the URL name combinations and locations to DNS resolver 304 to return to web browser 302. In another alternate embodiment, both DNS resolver 304 and DNS server 230 can implement multiending controller 310. Further, multiending controller 310 may reside in a system independent of DNS resolver 304 or DNS server 230 or may be a component of web browser 302.

Figure 4:
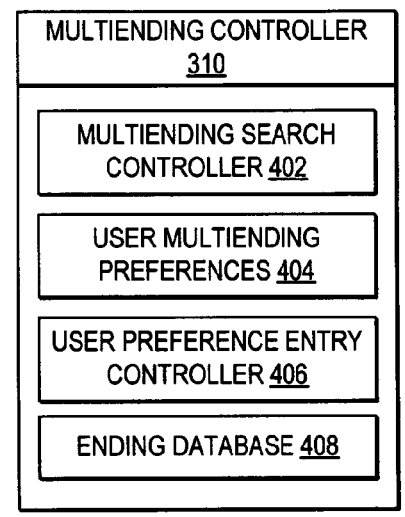
FIG. 4 is a block diagram depicting one embodiment of the components of a multiending controller.

Referring now to FIG. 4, a block diagram illustrates components of a multiending controller. In the example, multiending controller 310 includes a multiending search controller 402, user multiending preferences 404, user preference entry controller 406, and ending database 408. In one embodiment, multiending search controller 402 controls the performance of multiending controller 310, as described with reference to FIG. 3. In addition, according to an advantage, multiending search controller 402 accesses user multiending preferences 404 and ending database 408 and customizes the selection of URL name combinations and the output of multiending options 320 according to user multiending preferences 404. Examples of user multiending preferences 404 are depicted in FIG. 5.

A user preference entry controller 406 can direct a user through entry of user multiending preferences 404. It is important to note that user multiending preferences 404 may include preferences for a single user or multiple individual users and multiending preferences 404 may include preferences set by a network administrator for all network users or for by a particular service provider for all service users. It will be understood that the components of multiending controller 310 may reside within a single computer system or reside across multiple computer system accessible to one another via a network, such as network 102.

Ending database 408 can be updated to include all possible endings available in a particular network. Further, ending database 408 may include other types of network language identifiers, such as protocol type identifiers. Multiending search controller 402 may access ending database 408 to determine all possible endings for a portion of a URL entry. In addition, user multiending preferences 404 may reference the possible endings in ending database 408. Further, user preference entry controller 406 may access ending database 408 to provide a user with a selection of the possible endings. Ending database 408 may be updated periodically by accessing a network location that maintains a database of endings or through receipt of periodic communications including the database of endings.

Figure 5:
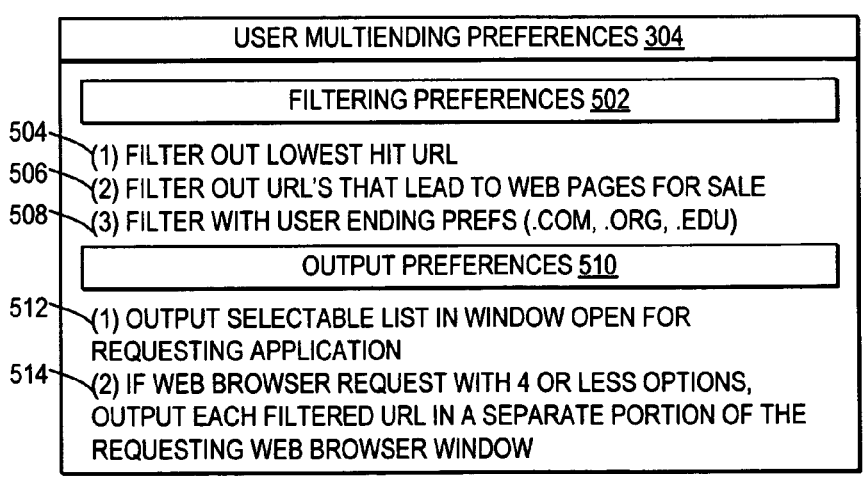
FIG. 5 is a block diagram depicting types of user multiending preferences.

With reference now to FIG. 5, a block diagram illustrates types of user multiending preferences. In the example, user multiending preferences 404 include filtering preferences 502 and output preferences 510. It will be understood that user multiending preferences 404 may include other types of preferences for controlling multiending search controller 402 and that multiending preferences 404 may be sorted according to user or other qualifier. In addition, it will be understood that while in the example, user multiending preferences 404 illustrates preferences already selected by a user, user preference entry controller 406 may prompt a user to add or delete pre-defined preferences or define new preferences within a user interface.

Under filtering preferences 502, a user may designate multiple types of preferences generally described as pre-resolution preferences and post-resolution preferences, based on whether the multiending search controller 402 applies the preference in determining the URL name combinations to resolve or in determining which URL name combinations with locations to include in multi-ending options 320 returned to the requesting application.

In the example depicted of a pre-resolution preference indicated at reference numeral 508, a user designates to select URL name combinations with endings of ".com", ".org", and ".edu". In another pre-resolution preference example, a user may select a preference to send the portion of the URL name to a search engine that searches for all possible combinations of the URL entry within a URL name combination or detects possible alternative combinations of letters in a URL entry that represents an available complete URL name. In yet another pre-resolution preference example, a user may select a preference for URL name combinations with protocol indicators of "www." and "ftp.", for example. It will be understood that user multiending preferences 404 may include other pre-resolution preferences that direct multiending search controller 402 in creating and selecting URL name combinations that include at least a portion of the URL name received in URL entry 304.

In the example depicted of post-resolution preferences indicated at reference numerals 504 and 506, a user designates to filter out the lowest hit URL and to filter out any URLs that lead to web pages that are for sale. In particular, when multiending search controller 402 receives the address locations of the selected URL name combinations, multiending search controller 402 can access each of the address locations and search the coding for each accessed web site to access information such as number of hits and whether the page is for sale. Multiending search controller 402 may also send the locations to web services that return statistical use and ownership status about web site locations. It will be understood that user multiending preferences 404 may include other post-resolution preferences that direct multiending search controller 402 in creating and selecting URL name combination with at least a portion of the URL name received in URL entry 304.

Under output preferences 510, a user may designate multiple types of preferences for output of the URL name combinations and address locations as multi-ending options 320. A user may specify output preferences in general, such as the output preference to direct display the multi-ending options in a selectable list in a window open for the application as indicated at reference numeral 512. In addition, a user may specify output preferences according to the application sending the URL entry. For example, output preference 514 indicates that if the URL entry is requested by a web browser and there are four or less URL name combinations, then the preference is to output a selectable thumbnail representation of the web page accessed from each filtered URL name combination in a separate portion of the requesting web browser window. In other example, a user may specify output preferences according to the number of accessible URL name combinations and locations or other conditional criteria. Other examples of output preferences may include a preference to open a separate window to display selectable multi-ending options.

In one example, output preferences 510 may be implemented through the following code:

```
first_choice=".com"
second_choice=".org"
third_choice=".net"
fourth_choice=".edu"
KEY=read in the URL entry
If (KEY contains only first, second, third or fourth choice) in its string
    display URL in browser window
else
    display KEY.first_choice as an icon HTML square in upper left
        quadrant
    display KEY.second_choice as icon HTML square in upper right
        quadrant
    display KEY.third_choice as icon HTML square in lower left quadrant
    display KEY.fourth_choice as icon HTML square in left right quadrant
```

It will be understood that the example code is provided as an illustration and does not limit the invention to a particular type of code or a particular format of code. Further, it will be understood that user preference entry controller 406 may provide a graphical user interface, through which a user enters selections that are stored as code, such as the example.

Figure 6:
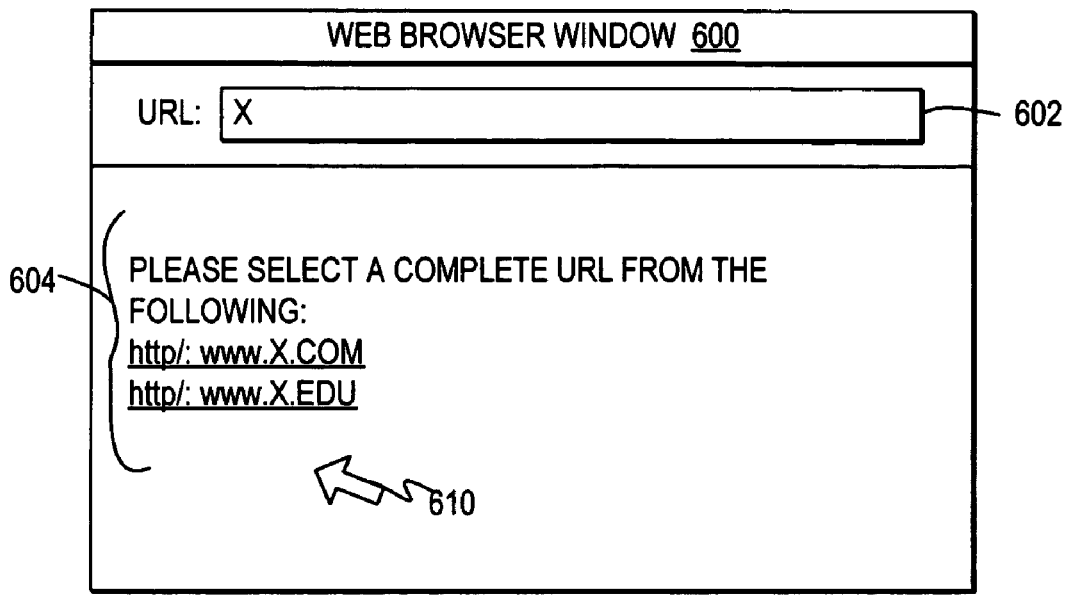
FIG. 6 is an illustrative representation depicting a web browser window including a selectable listing of a selection of URLs based on a portion of a URL name entered by a user.

Referring now to FIG. 6, an illustrative representation depicts a web browser window includes a selectable listing of a selection of URLs based on a portion of a domain name entered by a user as a URL. In the example, a web browser window 600 directed by a web browser includes a URL entry area 602. In the URL entry area 602, a user enters a portion of a domain name as "X". It will be understood that "X" may include multiple types of portions of URL names. The web browser directing web browser window 600 passes the portion of the URL name to a DNS resolver, for example, or other system enabled to retrieve a location for a URL name. Since the portion of the URL name "X" is not resolvable to a particular location, the portion of the URL name is passed to multiending controller 310. A selectable list within web browser window 604 illustrates the results of multiending controller 310 selecting possible URL name combinations with "X" and determining which URL name combinations have an addressable location. In the example, each URL name combination is a selectable link, where a user may select to access a web page accessible at the URL name combination by selecting the link through the positioning of cursor 610 without web browser window 600.

It is important to note that when a user enters a URL entry that does not indicate a protocol, such as http or ftp, then the web browser may automatically select a default protocol. Alternatively, multiending controller 310 may select a default protocol or may select URL name combinations with different protocols.

Figure 7:
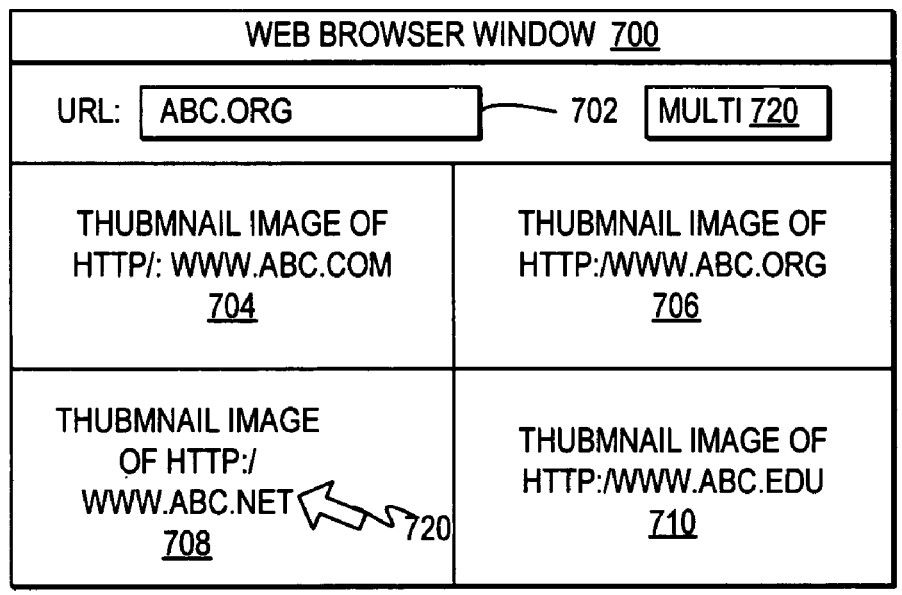
FIG. 7 is an illustrative representation depicting a web browser window that includes thumbnail images of the selection of URLs accessible based on a portion of a URL name entered by a user.

With reference now to FIG. 7, an illustrative representation depicts a web browser window that includes thumbnail images of the selection of URLs accessible based on a portion of a URL name entered by a user. In the example, a web browser window 700 directed by a web browser includes a URL entry area 702 in which the user has entered "ABC.org" with a request for multiple endings through selection of selectable multi button 720. It will be understood that a user may request multiple endings through other types of input and that a requesting application may include additional selectable interfaces or preference settings through which a user may indicate a preference to trigger multiending controller 310 for a particular URL entry or all URL entries.

Multiending controller 310 is triggered to receive the URL entry of "ABC.org" and select multiple URL name combinations of other ending types to "ABC". Multiending controller 310 resolves whether each URL name combination has an addressable location. Then, multiending controller 310 directs output of the URL name combinations with addressable locations by directing web browser window 700 to include selectable thumbnail images 704, 706, 708, and 710 each in a separate quadrant of web browser window 700. Each thumbnail image may include a reduced, selectable image of the web page accessible through the each URL name combination. A user may select one of selectable thumbnail images 704, 706, 708, or 710 and trigger opening of a full size image of the selected web page location.

Referring now to FIG. 8, a high level logic flowchart depicts a process and program for detecting an incomplete URL entry and resolving multiple possible URLs for the incomplete URL entry. As illustrated, the process starts at block 800 and thereafter proceeds to block 802. Block 802 depicts a determination of whether a multiending controller is triggered. It will be understood that other applications may pass incomplete URL entries to the multiending controller to trigger the multiending controller or that multiending controller may actively monitor a channel through which URL entries pass for error messages that trigger the multiending controller. Further, a user may request that the multiending controller be triggered for a particular URL entry.

If the multiending controller is triggered, then the process passes to block 804. Block 804 depicts the multiending controller selecting all possible URL combinations with at least a portion of the URL entry according to user preferences. Next, block 806 illustrates the multiending controller resolving the locations of each of the possible URL combinations. In resolving locations, multiending controller may pass each of the URL combinations to a DNS resolver, which directs resolution, or directly to a DNS server. Thereafter, block 808 depicts the multiending controller filtering the possible URLs according to user preferences. Next, block 810 illustrates the multiending controller directing output of the filtered URLs for selection according to user output preferences, and the process ends. In particular, in directing output of the filtered URLS for selection according to user output preferences, the multiending controller may dynamically create web pages for output in a web browser window or a separate window for output of the filtered URLs for selection by the user. Alternatively, where a web browser or other requesting application facilitates the output of multiending options, multiending controller may send directions for output of the filtered URLs according to the multiending output options of the requesting application.

Referring now to FIG. 9, a high level logic flowchart depicts a process and program for responding to multi-ending options. In particular, a web browser may facilitate the output of multi-ending options by including a selection of output interfaces specified for output of multiple URL name combinations responsive to a user entry of an incomplete URL. As illustrated, the process starts at block 900 and thereafter proceeds to block 902. Block 902 depicts a determination by the web browser whether a communication of multiple URL addresses is received. If multiple URL addresses are received, then the process passes to block 904. Block 904 depicts selecting one of multiple output formats for multiple URL addresses according to user output preferences. User output preferences may be indicated in the communication of multiple URL addresses or in separate user preferences associated with the web browser, for example. Next, block 906 illustrates facilitating the display of the multiple URL addresses according to the selected output format, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for determining multiple available domain names from a universal resource location (URL) entry comprising:
responsive to detecting a URL entry from a browser comprising at least a portion of a domain name at a domain name system (DNS) resolver of a computer system, automatically selecting, by said DNS resolver, a plurality of possible domain names for at least said portion of said domain name, wherein each of said plurality of possible domain names comprises a separate one of a plurality of ending types;
querying, by said DNS resolver, at least one DNS server to resolve each of said plurality of possible domain names;
detecting, by said DNS resolver from said at least one DNS server, a selection of said plurality of possible domain names each resolved with a separate associated network address within a network; and
directing, from said DNS resolver to said browser, concurrent output of a separate selectable thumbnail representation of a separate web page accessible from each of said selection of said plurality of possible domain names within an interface of said browser, such that a user is enabled to quickly determine said selection of said plurality of possible domain names from entry of at least said portion of said domain name as said URL entry.

2. The method according to claim 1, further comprising:
responsive to detecting an error message in an attempt by an address translation system to translate said domain name into an available network address, detecting by said DNS resolver said URL entry associated with said error message.

3. The method according to claim 1, wherein automatically selecting a plurality of possible domain names for at least a portion of said domain name, further comprises:
filtering said plurality of ending types by a user preference of said user comprising a selection of said plurality of ending types.

4. The method according to claim 1, further comprising:
responsive to detecting said selection of said plurality of possible domain names, filtering said selection of said plurality of possible domain names according to performance requirement for filtering out at least one of said selection of said plurality of possible domain names with a lowest number of hits recorded.

5. The method according to claim 1, wherein querying, by said DNS resolver at least one DNS server to resolve each of said plurality of possible domain names, further comprises:
directing a request to said at least one DNS server for translation of each of said plurality of possible domain names into each said separate associated network address.

6. The method according to claim 1, wherein directing concurrent output of a separate selectable thumbnail representation of a separate web page accessible from each of said selection of said plurality of possible domain names within an interface of said browser further comprises:
directing, by said DNS resolver, each separate selectable thumbnail representation in a separate position within said interface of said browser based on mapping each separate ending type of each separate selectable thumbnail representation to a specified position within the interface for each of said plurality of ending types.

7. The method according to claim 1, wherein directing concurrent output of a separate selectable thumbnail representation of a separate web page accessible from each of said selection of said plurality of possible domain names within an interface of said browser further comprises:
directing output of each of said selection of said plurality of possible domain names within a single web browser window, wherein each of said selection of said plurality of possible domains is represented by a selectable link listing.

8. A system that determines, in a computer network, multiple available domain names from a universal resource location (URL) entry, said system comprising:
a domain name system (DNS) resolver configured on at least one computer system having an interface for communicating over a computer network;
said DNS resolver configured to detect a URL entry entered by a user through a browser comprising at least a portion of a domain name;
said DNS resolver configured to automatically select a plurality of possible domain names for at least said portion of said domain name, wherein each of said plurality of possible domain names comprises a separate one of a plurality of ending types;
said DNS resolver configured to query at least one DNS server via said computer network to resolve each of said plurality of possible domain names;
said DNS resolver configured to detect a selection of said plurality of possible domain names each resolved with a separate associated network address within said computer network from said at least one DNS server; and
said DNS resolver configured to direct to said browser concurrent output of a separate selectable thumbnail representation of a separate web page accessible from each of said selection of said plurality of possible domain names within an interface of said browser to said user.

9. The system according to claim 8, said system further comprising:
said DNS resolver configured, responsive to detecting an error message in an attempt by an address translation system to translate said domain name into an available network address, to detect said URL entry associated with said error message.

10. The system according to claim 8, wherein said DNS resolver configured to automatically select a plurality of possible domain names for at least a portion of said domain name is further configured to filter said plurality of ending types by a user preference of said user comprising a selection of said plurality of ending types.

11. The system according to claim 8, said system further comprising:
said DNS resolver, responsive to detecting said selection of said plurality of possible domain names, configured to filter said selection of said plurality of possible domain names according to a performance requirement for filtering out at least one of said selection of said plurality of possible domain names with a lowest number of hits recorded.

12. The system according to claim 8, wherein said DNS resolver configured to query at least one DNS server to resolve each of said plurality of possible domain names is further configured to direct a request to said at least one DNS server for translation of each of said plurality of possible domain names into each said separate associated network address.

13. The system according to claim 8, wherein said DNS resolver configured to direct concurrent output of a separate selectable thumbnail representation of a separate web page accessible from each of said selection of said plurality of possible domain names within an interface of said browser is further configured to direct each separate selectable thumbnail representation in a separate position within said interface of said browser based on mapping each separate ending type of each separate selectable thumbnail representation to a specified position within the interface for each of said plurality of ending types.

14. The system according to claim 8, wherein said DNS resolver configured to direct concurrent output of a separate selectable thumbnail representation of a separate web page accessible from each of said selection of said plurality of possible domain names within an interface of said browser is further configured to direct output of each of said selection of said plurality of possible domain names within a single web browser window, wherein each of said selection of said plurality of possible domains is represented by a selectable link listing.

15. A computer program product for determining multiple available domain names from a URL entry, the computer program product comprising:
a computer readable non-transitory storage medium having computer readable program code embodied therewith, the computer readable program code comprising:
computer readable program code configured to detect a URL entry from a browser comprising at least a portion of a domain name at a domain name system (DNS) resolver;
computer readable program code configured to automatically select, by said DNS resolver, a plurality of possible domain names for at least said portion of said domain name, wherein each of said plurality of possible domain names comprises a separate one of a plurality of ending types;
computer readable program code configured to query, by said DNS resolver, at least one DNS server to resolve each of said plurality of possible domain names;
computer readable program code configured to detect, by said DNS resolver from said at least one DNS server, a selection of said plurality of possible domain names each resolved with a separate associated network address within a network; and
computer readable program code configured to direct directing, from said DNS resolver to said browser, concurrent output of a separate selectable thumbnail representation of a separate web page accessible from each of said selection of said plurality of possible domain names within an interface of said browser.

16. The computer product according to claim 15, the computer program product further comprising:
computer readable program code configured to direct a request to said at least one DNS server for translation of each of said plurality of possible domain names into each said separate associated network address.

17. The computer program product according to claim 15, the computer program product further comprising:
computer readable program code configured to direct each separate selectable thumbnail representation in a separate position within said interface of said browser based on mapping each separate ending type of each separate selectable thumbnail representation to a specified position within the interface for each of said plurality of ending types.

18. The computer program product according to claim 15, the computer program product further comprising:
computer readable program code configured to direct output of each of said selection of said plurality of possible domain names within a single web browser window, wherein each of said selection of said plurality of possible domains is represented by a selectable link listing.

* * * * *